Patented Jan. 21, 1936

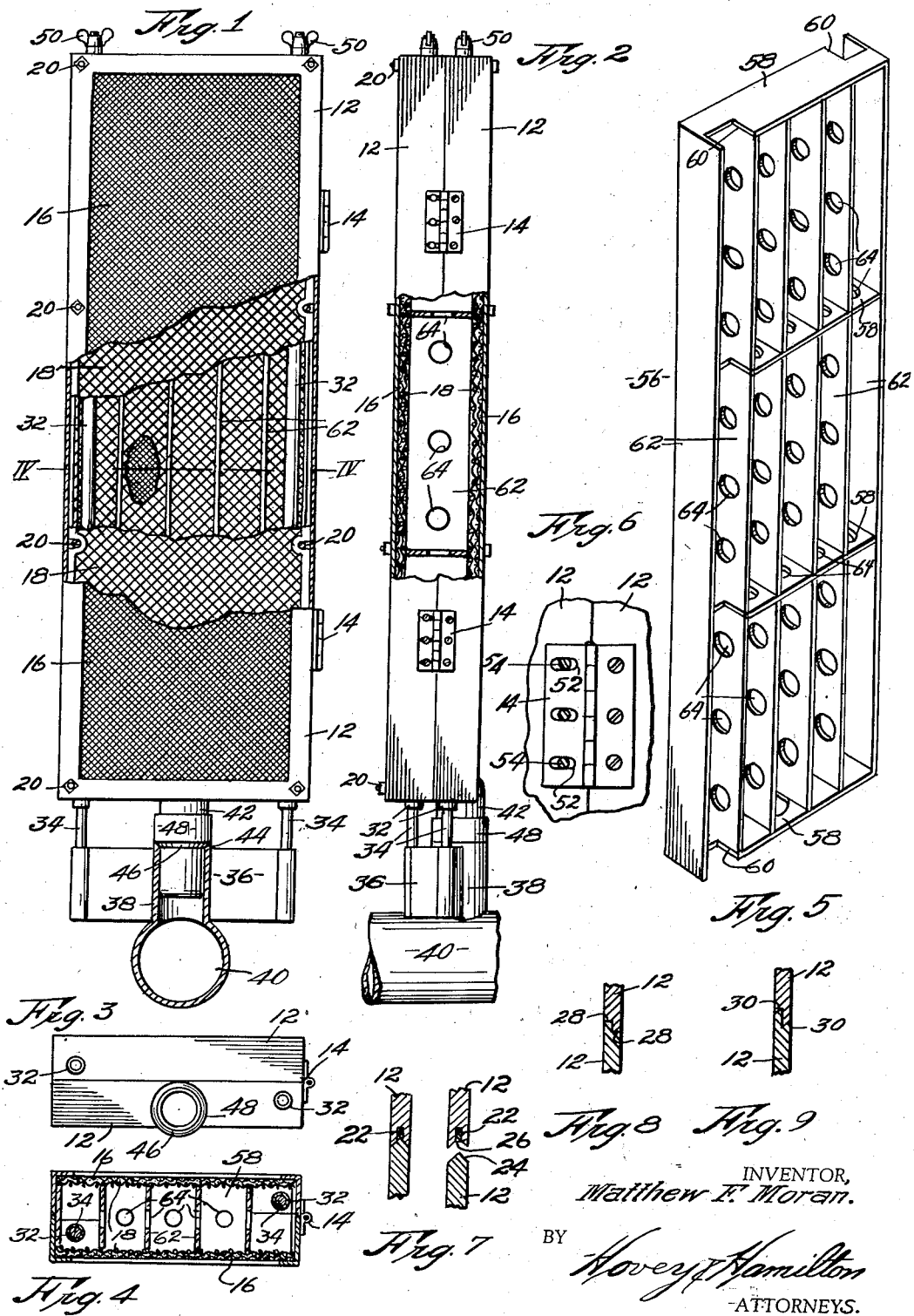

2,028,466

UNITED STATES PATENT OFFICE 2,028,466

FILTER LEAF

Matthew F. Moran, Kansas City, Mo.

Application May 14, 1934, Serial No. 725,556

4 Claims. (Cl. 210—181)

This invention relates to filter leaves of the type customarily used in filter tanks into which the material to be strained or filtered is emptied, after which it passes through the screens of the filter leaves and from the tank through a suitable pipe or header, and the primary object of this invention is the provision of a novel and specially formed filter leaf which comprises, among other structural elements, a pair of articulated open frames having screens closing one side thereof to combine therewith in creating a cavity which receives the material being filtered and from which the filtered material is withdrawn through suitable connections to the aforesaid header.

One of the important aims of the instant invention is to provide a unique filter leaf that may be quickly removed from its operative position and subsequently cleaned and replaced without the necessity of spending a great amount of time in disassembling and without the need of special high pressure nozzles or other equipment that is so often necessary in thoroughly cleaning filter leaves having parts that are inaccessible.

A further object of this invention is to provide a quickly cleanable filter leaf, having as a part thereof, a grid that is removably disposed within the cavity of the filter leaf and which holds the screens of the leaf against inward sagging, all to the end that exceptionally high pressures might be employed in the filter without overcoming the filtering action of the leaf itself.

Heretofore it has been impossible to quickly remove filter leaves from their operative positions without manipulating a large number of pipe connections and supporting members and this invention contemplates a structure which includes a plurality of rods that slidably engage the filter leaf and which serve also to hold the articulated frames of the filter leaf in closed and locked together position.

Other objects of this invention will appear during the following specification, referring to the accompanying drawing, wherein:

Figure 1 is a broken-away side elevation of a filter leaf made to embody this invention.

Fig. 2 is an edge elevation of the leaf, with a part broken away for clearness.

Fig. 3 is a plan view of the lower end of the filter leaf.

Fig. 4 is a cross sectional view of the filter leaf taken on line IV—IV of Fig. 1.

Fig. 5 is a perspective view of the grid entirely removed from association with the rest of the filter leaf.

Fig. 6 is an enlarged, detailed view of the hinge connection between the frames of the filter leaf.

Fig. 7 is a fragmentary, detailed, sectional view through the abutting edges of the frames of the filter leaf, illustrating the seal and showing the frames in both the open and closed position.

Fig. 8 illustrates a frame joint embodying a modified form of a joint, and,

Fig. 9 is still another modification of a frame joint.

It is preferable that the parts of the filter leaf be formed of some non-corrosive material and in actually making the leaf itself, there should be formed a pair of open frames 12, hinged together along one side as at 14, so that the frames may be opened and closed after they are removed from their operative position.

The pressure in a filter is exerted inwardly upon the screens 16 and 18 which are stretched across one side of each frame 12 to form therewith a chamber within the filter leaf proper. This inward pressure assists in holding together frames 12, but to supplement the action, there is provided a plurality of locking bolts 20 and to insure a leak-proof joint between the abutting edges of frame 12, forms such as illustrated in Figs. 7, 8 and 9 may be utilized and in the first mentioned, a gasket 22 of resilient material further effects a tight joint. In the preferred form, the abutting edges of frames 12 are respectively tongue and grooved as at 24 and 26 and their complementary, cross-sectional contour, in combination with gasket 22 effects the necessary seal.

In Fig. 8 the abutting edges of frames 12 are shouldered as at 28 and in the form illustrated in Fig. 9, these shoulders 30 are inclined with respect to the parallel sides of frames 12.

Each of the two frames 12 has a tube 32 extending longitudinally therethrough adjacent one side thereof and the tube 32 of one frame 12 is diagonally opposed to the tube 32 of the other frame 12 when the leaf is in the closed position. This relation is clearly shown in Figs. 3 and 4. Tubes 32 serve as one of the mediums of support for this filter leaf in that each engages a standard 34 that is carried by yoke 36 which, in turn, is mounted upon a branch 38 formed on header 40. It is through this header 40 that the filtered material is removed from the ordinary filter tank not here shown and the connection with the interior of the filter leaf is made through the further employment of pipe 42 which is in telescoping relation with branch 38 when the filter leaf is in the operative position.

The upper end of branch 38 is tapered inwardly as at 44 to receive the inclined edge 46 of collar 48, integral with pipe 42. It is this point of connection that serves as a support for the entire filter leaf structure. Rods 34 extend through tubes 32 and beyond the upper end thereof to receive securing means in the form of nuts 50 that are in screwthreaded engagement with the upper end of standards 34. Obviously, when standards 34 are projected through the two tubes 32, frames 12 could not be moved about their hinge connections 14. Rods 34 slidably carry the entire filter leaf and when it is desired to remove and clean the same, it is but necessary to remove nuts 50 and lift the filter leaf from engagement with rods 34 and branch 38 of header 40.

Any tightening force that is exerted when bolts 20 are brought into play finds compensation in the specially formed hinge 14 which is provided with slots 52 that receive screws 54 which hold the frames 12 in an articulated relation, yet allows slight movement toward and from each other as the necessity arises.

It is desirable in filter leaves of this type to employ a grid 56 of the general character illustrated in Fig. 5 and for the purpose of holding screens 16 and 18 against inward sagging. This grid 56 is removably disposed within the cavity of the filter leaf and its transverse members 58 are cut away or notched as at 60 to clear tubes 32. Both the transverse members 58 and longitudinal members 62 of grid 56 have openings 64 formed therethrough to permit freedom of movement on the part of the filtered material so that it finds its way to the outlet pipe 42 that extends from one of the frames 12. The necessity of having this pipe 42 extend from but one of frames 12 is obvious. When cleaning the filter leaf the grid 56 and supporting screens 18 may be removed from the frames and cleaned separately.

When a filter leaf made as hereinbefore described is removed from the operative position within the filter tank, it may be opened to permit access to both sides of the screens and all parts of the structure may be thoroughly and quickly cleaned in an exceptionally short time.

Having thus described the invention, what is claimed as new and desired to be secured by Letters Patent is:

1. A filter leaf of the character described comprising a pair of articulated frames each having a screen across one side thereof; means for permitting the escape of material from within the filter leaf other than said screens; a pair of standards for supporting the filter leaf; and means on the said frames for slidably engaging the said standards, said means comprising a tube extending through each frame respectively from one end to the opposite end therof.

2. A filter leaf of the character described comprising a pair of articulated frames each having a screen across one side thereof; means for permitting the escape of material from within the filter leaf other than said screens; a pair of standards for supporting the filter leaf; and means on the said frames for slidably engaging the said standards, said means comprising a tube extending through each frame respectively from one end to the opposite end thereof, said standards being long enough to extend through said tubes and project therefrom, said rods having securing means on the projected ends thereof to preclude displacement of the said filter leaf.

3. A filter leaf of the character described comprising a pair of frames hingedly interconnected at one edge; a screen across one side of each frame to combine therewith in creating a cavity within the said leaf; a grid within said cavity to hold the said screens against inward sagging; a pair of standards to slidably engage the frames of said leaf; a tube extending longitudinally through each frame respectively to slidably receive one of the said standards; and means to lock said filter leaf against removal from said standards.

4. A filter leaf of the character described comprising a pair of articulated frames each respectively having a screen across one side thereof and being hinged together along adjacent edges to permit swinging the frames apart; means for permitting the escape of material from within the filter leaf; a pair of filter leaf supporting standards; and means formed by each frame respectively for engaging one of the standards, said standards being in offset relation, and on opposite sides of the plane of separation of the frames to prevent their swing apart when supported by the standards.

MATTHEW F. MORAN.